United States Patent Office 3,444,296
Patented May 13, 1969

3,444,296
METHOD OF CONTROLLING REPRODUCTIVE CYCLE WITH 6α - METHYL - 17α HYDROXY-PROGESTERONE 17-ACETATE
George B. Spero, Kalamazoo, Mich., assignor to The Upjohn Company, Kalamazoo, Mich., a corporation of Delaware
No Drawing. Continuation-in-part of applications Ser. No. 685,391, Sept. 23, 1957, and Ser. No. 832,909, Aug. 11, 1959. This application June 28, 1960, Ser. No. 39,333
Int. Cl. A61k 17/06
U.S. Cl. 424—243                                4 Claims This invention relates to steroid compositions and more particularly to progestational compositions containing 6α-methyl-17α-hydroxyprogesterone 17-acetate. It also relates to processes for treating ovulating mammals and birds. The present application is a continuation-in-part of application Ser. No. 832,909, filed Aug. 11, 1959, now abandoned, and application Ser. No. 685,391, filed Sept. 23, 1957, now U.S. Patent No. 3,377,364.

The steroid compound used in the compositions of the present invention is prepared according to the methods described in application Ser. No. 685,391.

The present invention provides therapeutic compositions comprising 6α - methyl - 17α - hydroxyprogesterone 17-acetate and a pharmaceutical carrier, for example, oral, injectable, animal feed and bird feed carriers. The invention also provides methods of treating ovulating mammals and birds.

As used in the specification and claims of this application, oral pharmaceutical carrier is intended to include solid oral carriers, as used in capsules, pills, pilules, and tablets, and liquid oral carriers, as used in elixirs, solutions, suspensions and syrups. The term injectable pharmaceutical carrier is intended to include water for injection, sterile aqueous solutions, sterile vegetable oils, sterile vegetable oil solutions, and the like. The term animal feed carrier is intended to incude feed as used for livestock, dogs, cats and the like. The term bird feed carrier is intended to include feed and mash as used for chickens, turkeys and the like.

It is especially advantageous to formulate the inventive composition in solid and liquid dosage unit forms for ease and economy of administration and uniformity of dosage. Dosage unit form as used in the specification and claims herein refers to physically discrete units suitable as unitary dosages for animal, human and bird subjects, each unit containing a predetermined quantity of active material calculated to produce the desired therapeutic effect in association with the required pharmaceutical carrier. The specifications for the novel dosage unit forms of this invention are dictated by and directly dependent on (a) the unique characteristics of the active material and the particular therapeutic effect to be achieved and (b) the limitations inherent in the art of compounding such an active material for therapeutic use in animal, human and bird subjects as disclosed in detail in this specification, these being features of the present invention. Examples of the dosage unit forms heretofore described are a tablet, a capsule, a pill, a powder packet, a wafer and a cachet; a dropperful, a teaspoonful, and a tablespoonful; an ampule and a vial; and segregated multiples thereof, and other forms alluded to herein. In accordance with the specific type of the final composition, the principal therapeutically active ingredient is formulated with the appropriate carrier. In the case of a solid dosage unit form, the said carriers comprise disintegrators, lubricants, diluents, binders, flavors and the like. In the case of a liquid dosage unit form, the said carriers comprise water, edible oils, alcohol, glycols, colors, flavors, sweetening agents, suspending agents, surfactants, preservatives, and the like. In the case of an injectable dosage unit form, the carriers comprise water, ethanol, vegetable oils, preservatives, bactericidal and bacteriostatic agents, suspending agents, surfactants, isotonic agents, and the like. The animal and bird feed carriers comprise in balanced amounts the essential dietary constituents protein, fat, carbohydrate, minerals, and the like. Premixes, for addition to animal and bird rations, contain ingestible bulking agents or diluents which can be dietary constituents, and the principal active ingredient in a concentration suited for the addition of the said ingredient in amounts calculated on the weight of the animal or bird under treatment.

Complementary therapeutically active ingredients can be added to the inventive compositions. The said ingredients include estrogenic substances, for example, estrone, estradiol, estriol, ethinyl estradiol, estradiol cyclopentylpropionate, diethylstilbestrol, and the like; analgesics, for example, acetylsalicyclic acid, N-acetyl-p-aminophenol, salicylamide, phenacetin, and the like; sedatives, for example, phenobarbital, carbromal, reserpine, ectylurea, and the like; diuretics, for example, ethoxzolamide, hydrochlorothiazide, acetazolamide and the like; tranquilizers, for example, mepazine, perphenazine, oxanamide, and the like; muscle relaxants, for example, corisoprodol, chlorzoxazone, phenaglycodol, and the like.

The inventive compositions are administered in varying dosages depending on the weight and condition of the mammals and birds under treatment, the route of administration, i.e., oral administration or parenteral injection, the particular affliction to be treated and the nature of the desired results.

The solid oral dosage unit forms comprise from about 2 to about 200 mgs. of the principal active ingredient per dosage unit and are used from 1 to 4 times daily to provide total daily dosages of from about 2 mg. to about 400 mgs. of the said ingredient. Adult human dosage would range from about 2 to about 50 mgs. of the principal active ingredient per dosage unit.

The liquid oral dosage unit forms comprise from about 0.1 to about 5% by weight of the principal active ingredient and are used from 1 to 4 times daily to provide total daily dosages of from about 2 to about 200 mgs. of the said ingredient.

The dosage unit forms for injectable use include a single dose product comprising from about 15 to about 35 mgs. of the principal active ingredient and a multiple dose product comprising from about 0.25 to about 10% by weight of the principal active ingredient. The latter product is administered by parenteral injection in amounts of from about 0.1 to about 5 mls. to provide dosages of from about 0.25 to about 500 mgs. of the said ingredient.

The animal feed compositions comprise from about 0.0005 to about 0.3% by weight of the principal active ingredient. The bird feed compositions comprise from about 0.0002 to about 0.3% by weight of the principal active ingredient. The compositions provide the said ingredient in daily dosages to the variety of animals and birds of from about 0.1 to about 15 mgs. per lb. of body weight.

The veterinary premixes comprise from about 0.05 to about 5% by weight of the principal ingredient. Said mixes are added to the daily rations in amounts calculated to provide the said ingredient in daily dosages of from about 0.1 to about 15 mgs. per lb. of body weight.

The compositions of the present invention are novel and useful therapeutic preparations possessing unexpected, advantageous and beneficial results in the treatment of ovulating mammals and birds, for example, to reestablish normal endometrium-ovary-anterior pituitary relationships, in forestalling habitual and threatened abortion, in easing premenstrual tension in humans, and to prevent ovulation. In the practice of veterinary medicine, the compositions provide beneficial and advantageous results in the hormonal control of the reproductive cycle in animals, for example, by increasing in animals the number of implanted fertilized ova, of live births and the viability thereof; by synchronization of the estrual period in a group of swine, cattle, horses, sheep, dogs or cats; and by providing compositions and methods to further weight gain with lessened estrogenic side effects in beef cattle. In birds there are provided compositions and methods to control the moulting period and the egg laying period of a flock, and to increase the number of eggs. The species variations in the estrual periods of the ovulating mammals must be taken into account in the several uses of the inventive compositions. When cycling, cows, horses, sheep, swine and cats have normal estrual periods about 21 days apart; dogs about 6 months apart. Thus, the treatment to synchronize the estrual period, whether oral or injectable, is continued for a maximum number of days ascertainable by reference to the last known estrual period of the particular species. Prolonged prevention of the estrual periods is brought about by continued treatment.

The following examples illustrate the best mode contemplated by the inventor of carrying out the invention and are not to be construed as limiting.

Example 1.—Oral tablet 50,000 tablets for oral administration are prepared from the following types and amounts of materials. Each tablet contains 3.0 mgs. of the active ingredient.

6α-methyl-17α-hydroxyprogesterone 17-acetate _____ ozs__ 5
Lactose _____ lbs__ 3

The finely powdered steroid and lactose are mixed well and granulated with syrup-starch paste. Starch and calcium stearate are used as lubricants in the compressing step.

The oral administration of 1 tablet daily provides good results in the treatment of secondary amenorrhea in humans.

Example 2.—Oral tablet 10,000 tablets for oral administration are prepared from the following types and amounts of ingredients. Each tablet contains 10 mgs. of the active ingredient.

| | Gms. |
|---|---|
| 6α - methyl - 17α - hydroxyprogesterone 17 - acetate | 100 |
| Lactose | 2600 |

The finely powdered steroid and lactose are mixed well and granulated with syrup-starch paste. Starch and calcium stearate are used as lubricants in the compressing step.

The tablets are administered orally 3 times daily with good results in the treatment of habitual and threatened abortion in humans.

Similarly, tablets, each containing 25 mgs. and 50 mgs. of the steroid, are prepared for the administration of larger dosages.

Example 3.—Single dose injectable product 1000 mls. of a sterile solution are prepared from the following types and amounts of ingredients:

6α-methyl-17α-hydroxyprogesterone 17-acetate _____ mgs__ 800
Ethanol _____ mls__ 760
Water for injection U.S.P., q.s. ad _____ mls__ 1000

The steroid is dissolved in the ethanol and the solution made up to volume with the water. The whole is sterilized by passage through a sterilizing filter and filled aseptically into sterile ampoules. A 25-ml. daily dose containing 20 mgs. of steroid is added to an intravenous infusion of saline with beneficial results in the treatment of endometriosis and abortion in humans.

200 mls. of polysorbate 80 U.S.P. is used in the above formula to provide another solution which is also useful in the treatment of endometriosis and abortion.

Example 4.—Multiple dose injectable product 10,000 mls. of a sterile aqueous suspension are prepared from the following types and amounts of ingredients:

| Each ml. | Total |
|---|---|
| 5 mgs. 6α-methyl-17α-hydroxyprogesterone 17-acetate _____ gms__ | 50 |
| 9 mgs. sodium chloride _____ gms__ | 90 |
| 0.2 mg. preservative _____ gms__ | 2 |
| Q.s. water for injection U.S.P. ad _____ mls__ | 10,000 |

The sodium chloride and preservative are dissolved in the water and the whole is sterilized by passage through a sterilizing filter. The steroid is micronized, sterilized by exposure to sterilizing vapor and added aseptically to the sterile aqueous solution. Dispersion is accomplished by mixing through a sterile homogenizer. The final suspension is filled aseptically into sterile vials. The duration of action of the suspension is prolonged. Beneficial results in the treatment of endometriosis and recurrent abortion in humans are obtained by the injection of 1 ml. one to three times monthly. Inhibition of ovulation can be brought about by like dosages.

To provide a suspension for use to delay estrus in a group of cows the amount of the steroid acetate is increased to 1000 gms. providing a suspension containing 100 mgs. per ml. The injection of 1 ml. per cow per day for a maximum of 21 days is effective in delaying estrus. Upon cessation of treatment the group concurrently comes into estrus and can be bred successfully.

Similar suspensions containing 25 and 50 mgs. per milliliter, respectively, are prepared to obtain comparable results in the treatment of other species.

Example 5.—Oral aqueous suspension

An aqueous suspension for oral administration, containing in each teaspoonful (approximately 5 mls.) 5 mgs. of 6α-methyl-17α-hydroxyprogesterone 17-acetate, is prepared from the following types and amounts of ingredients:

| 6α - methyl - 17α - hydroxyprogesterone 17 - acetate _____ gm.__ | 1 |
|---|---|
| Preservative _____ gms.__ | 2 |
| Flavor _____ | q.s. |
| Purified water U.S.P., qs.. ad _____ mls.__ | 1000 |

The preservative and flavor are dissolved in the water. The finely powdered steroid is added and the whole homogenized.

A daily dose of 1 teaspoonful (5 mls.) gives good results in the treatment of menstrual disorders in humans.

0.2 gm. of estrogenic crystallizate (naturally occurring equine estrogens principally estrone, equilin and equilenin with a possible trace of estradiol) is added to the above formula to provide another suspension with beneficial results in the treatment of human menstrual disorders.

Example 6.—Oral tablets 10,000 compressed tablets are prepared from the following types and amounts of ingredients:

| Each tablet | Total, gms. |
|---|---|
| 2.5 mgs. 6α-Methyl-17α-hydroxyprogesterone 17-acetate _____ | 25 |
| 300 mgs. ectylurea _____ | 3000 |
| 150 mgs. lactose _____ | 1500 |
| 3 mgs. acacia _____ | 30 |
| 65 mgs. starch bolted _____ | 650 |
| 3 mgs. calcium stearate _____ | 30 |

The first four ingredients are finely powdered and mixed well. The whole is granulated with syrup-starch paste. The dried granules are well mixed with the starch-calcium stearate lubricant mixture. The whole is compressed into tablets.

Good results, with potentiated complementary sedative action, are obtained in the treatment of threatened abortion at a dosage of 1 tablet per day.

350 gms. of ethoxyzolamide is added to the above formulation to provide tablets useful for the treatment of pre-menstrual tension at a dosage of 1 tablet per day.

Example 7.—Aqueous oral suspension 4000 mls. of a fluid drop preparation suitable for the addition of measured amounts to animal feed is prepared from the following types and amounts of ingredients:

| | |
|---|---|
| Preservative gms. | 14 |
| Surfactant gms. | 3.6 |
| 6α - Methyl - 17α - hydroxyprogesterone 17-acetate gms. | 50 |
| Purified water U.S.P., q.s. ad mls. | 4000 |

The preservative is added to 500 mls. of the water at about 55° C. The surfactant is added followed by the micronized steroid. The whole is made up to volume with the balance of the water and passed through an homogenizer.

For the control of the estrual period of a 10 kilo bitch, 1 ml. is added daily to the animal ration to provide a daily dosage of 12.5 mgs. of the steroid equivalent to 1.25 mgs. per kilo of dog weight per day. After cessation of treatment, the animal comes into heat and can be bred successfully.

For the synchronization of the moulting period in poultry 8 mls. are mixed daily into 50 lbs. of feed mash for a flock of 100 heavy breed (5.5 lbs.) hen chickens to provide a daily dosage in one-half pound of the mash, of 1 mg. of the steroid equivalent to 0.4 mg. per kilo of hen chicken weight per day. After cessation of treatment the chickens begin to lay concurrently.

Example 8.—Oral hard gelatin capsule 1000 hard gelatin, two-piece capsules for oral administration, each containing 200 mgs. of 6α-methyl-17α-hydroxyprogesterone 17 acetate, are prepared from the following types and amounts of materials:

| | |
|---|---|
| 6α - methyl - 17α - hydroxyprogesterone 17 - acetate gms. | 200 |
| Starch-lactose mixture | q.s. |

The finely powdered steroid and starch-lactose mixture are mixed and then encapsulated by the usual techniques into two-piece capsules.

A daily does of 2 capsules gives good results in the control of the estrual period in mares. After cessation of treatment, the mares can be bred successfully at approximately the same time.

Example 9.—Veterinary pre-mix

A dry pre-mix suited for incorporation into the normal diet of dogs is prepared from the following types and amounts of materials:

PART I

| | Lbs. |
|---|---|
| 6α - methyl - 17α - hydroxyprogesterone 17 - acetate | 1 |
| Liver protein | 64 |
| Whole liver powder | 60 |
| Fish meal | 200 |
| Terra alba | 24 |
| Dicalcium phosphate | 100 |
| Ferrous gluconate powder | 6½ |

PART II

| | Lbs. |
|---|---|
| Lecithin | 32 |
| Wheat germ oil | 11½ |
| Brewer's yeast | 200 |

The Part I ingredients are mixed well together. The Part II wheat germ oil is mixed with the warmed lecithin and this mixture is added slowly to the brewer's yeast. The Part II mixture is then blended well with the Part I mixture to give the final product. Each 3.5 gms. (approximately 1 teaspoonful) of the final mixture contains 5 mgs. of the active ingredient, 6α-methyl-17α-hyroxyprogesterone 17-acetate. The proper amount of this pre-mix to be added to the animal ration can be calculated from the weigth of the animal, the required dosage of active ingredient, and the amount of food consumed per day. In Kirk's Index of Treatment in Small-Animal Practice, published in 1951 by The Williams and Wilkins Company, there is a table on page 713 of food requirements in dogs:

TABLE IV

Food maintenance requirements of mature dogs

| Body weight (Kg.) | Grams of food per animal fresh basis (70 percent moisture) per day |
|---|---|
| 1 | 118 |
| 2 | 195 |
| 3 | 262 |
| 4 | 323 |
| 5 | 380 |
| 6 | 433 |
| 7 | 487 |
| 8 | 537 |
| 9 | 583 |
| 10 | 630 |
| 20 | 1040 |
| 30 | 1410 |
| 40 | 1740 |
| 50 | 2043 |

Another table, Number V, is given on page 712 of the same publication:

TABLE V

The following table of approxiate quantities of food per day, for maintenance of an adult animal in a well-nourished condition, is one which is considered fairly reliable as a general guide:

| | | |
|---|---|---|
| St. Bernards, mastiffs, great danes | lbs. | 2.5–4.5 |
| Collies, retrievers, alsatians and similar | lbs. | 1.5–2.5 |
| Greyhounds | lbs. | 1.8–2.5 |
| Airedales, chows, bulldogs and similar | lbs. | .8–1.5 |
| Fox terriers, welsh terriers, scotties, etc. | ozs. | 8–12 |
| Pugs, poms, pekingese | ozs. | 4–8 |
| Cats | ozs. | 4–8 |

From the above tables the amount of premix to be added daily to the food can be calculated. For example, using Table IV, to the 1740 gms. of good per day for the 40 kg. bitch, at a daily dosage of 0.5 mg. of active ingredient per kg. of body weight, 4 teaspoonfuls of food supplement are used. Using Table V, to the approximately 3 lbs. of food per day for the St. Bernard, at a total daily dosage of 10 mgs. of active ingredient, 2 teaspoonfuls of food supplement are added. The daily addition to the diet is continued as long as control of the estrual period is desired. Thereafter, the dog will come into heat and can be bred successfully.

Example 10.—Animal feed composition

Ready-mixed feed is prepared in the following manner:

| | |
|---|---|
| Commercial dog feed lbs. | 100 |
| 6α-methyl-17α-hydroxyprogesterone 17-acetate mgs. | 400 |

The steroid is worked into a portion of the feed by careful mixing and the mix is incorporated uniformly into the remaining feed by milling. Each pound of the finished preparation contains 4 mgs. of the steroid providing a total daily dose of 5 mgs. for a 10 kilo dog eating 1¼ lb. of the feed per day. This daily dose is effective in preventing estrus in the female dog.

Example 11.—Bird feed composition

A mash feed mix for hen chickens is prepared from the following types and amounts of materials:

Laying mash _____ lbs__ 100
6α-methyl-17α-hydroxyprogesterone 17-acetate
                     mgs__ 200

The steroid is worked into a portion of the mash by careful mixing and the mix is incorporated uniformly into the remaining mash by milling. Each pound of the finished preparation contains 2 mgs. of the steroid providing a daily dose of 1 mg. of the progestational compound for a heavy breed hen eating ½ lb. of the mash per day. This daily dose is effective in controlling the moulting period.

Example 12.—Veterinary premix with tranquilizer

Following the procedure of Example 9, a feed supplement containing perphenazine in addition to the steroid is prepared by adding 1 lb. of perphenazine to the Part I mixture, without impairing the effectiveness of the supplement in controlling the estrual period in bitches.

Example 13.—Implantation pellet 1000 pellets for implantation in beef cattle are prepared from the following types and amounts of materials:

|  | Gms. |
|---|---|
| 6α-methyl-17α-hydroxyprogesterone 17-acetate | 200 |
| Estradiol cyclopentylpropionate | 20 |

The two ingredients are blended with an inert diluent into a uniform mixture. The mixture is slugged and screened to a powdery consistency. The powder is compressed into pellets, each containing 200 mgs. of the progestational compound and 20 mgs. of the estrogenic compound.

Good results in the weight increase of growing beef cattle, especially in steers, are obtained by implantation of one pellet at the time the cattle go on full feed for fattening.

Example 14.—Veterinary premix 10,000 gms. of a premix is prepared from the following types and amounts of ingredients:

| 6α-methyl-17α-hydroxyprogesterone 17-acetate | gms__ | 300 |
|---|---|---|
| Soybean meal | gms__ | 9700 |
| Chloroform, U.S.P. | mls__ | 1500 |

A chloroform solution of the steroid active ingredient is prepared and incorporated gradually and uniformly into the soybean meal. After adequate mixing the whole is vacuum dried to remove any trace of chloroform.

Each gm. of the premix contains 30 mgs. of the active ingredient. The premix is added to the standard ration of a group of gilts to provide a daily dose to each gilt of 0.4 mg. of the steroid per lb. of gilt weight. Treatment for a maximum of 21 days prevents estrus. Thereafter the gilts come concurrently into estrus for breeding purposes. Like prevention of estrus in heifers occurs at a dosage of 0.4 mg. of the steroid acetate per lb. of heifer weight per day for a maximum of 21 days.

The addition to the rations of a group of bred sows of an amount of the premix providing 1 mg. of the steroid acetate per lb. of sow body weight per day is beneficial in unexpectedly increasing the number of implanted fertilized ova. 150 mgs. of diethylstilbestrol can be added to the above formula to complement the action of the steroid acetate composition.

An equally satisfactory premix is prepared by omitting the chloroform and using mineral oil to facilitate the preparation of a uniform premix which is well suited for later incorporation into the animal ration.

Example 15.—Veterinary bolus 9000 boluses, each containing 180 mgs. of the steroid acetate, are prepared from the following types and amounts of ingredients:

|  | Gms. |
|---|---|
| 6α-methyl-17α-hydroxyprogesterone 17-acetate | 1,620 |
| Lactose | 58,320 |

The above ingredients are blended and granulated with syrup-starch paste, and q.s. mineral oil is added. The granulation is then dried, lubricated with starch, talc and calcium stearate powders, and compressed with a 1½" x 11/16" die.

The oral administration to a cycling mare of one bolus per day is effective in the control of estrus. The treatment is especially advantageous in racing mares.

Example 16.—Oral tablets

Following the procedure of Example 6, 5000 tablets are prepared from the following types and amounts of ingredients:

| Each tablet | | Total |
|---|---|---|
| 5 mgs. 6α-methyl-17α-hydroxy-progesterone 17-acetate | gms__ | 25 |
| 0.01 mg. ethinyl estradiol | mgs__ | 50 |
| 150 mgs. lactose | gms__ | 750 |
| 3 mgs. acacia | gms__ | 15 |
| 65 mgs. starch, bolter | gms__ | 325 |
| 3 mgs. calcium stearate | gms__ | 15 |

Good results in the inhibition of ovulation in humans are obtained at a daily dosage of 1 tablet orally.

Tablets equally suited for the inhibition of ovulation are prepared by using 250 and 1000 mgs., respectively, of the ethinyl estradiol in place of the 50 mgs. in the above formulation.

What is claimed is:

1. The process for the synchronization of estrus in ovulating animals which comprises the oral administration to said animals of an effective amount of a pharmaceutical preparation comprising from about 0.0005 to about 5% by weight of 6α-methyl-17α-hydroxyprogesterone 17-acetate and an animal feed carrier.

2. A pharmaceutical composition for orally treating premenstrual tension in a human which comprises in dosage unit form from about 2 to about 25 mg. of 6α-methyl-17α-hydroxy-progesterone 17-acetate, a sedative selected from the group consisting of phenobarbital, carbromal, reserpine and ectylurea, a diuretic selected from the group consisting of ethoxzolamide, hydrochlorothiazide and acetazolamide and an oral pharmaceutical carrier.

3. A dry veterinary premix for orally controlling the reproductive cycle in ovulating animals and birds which comprises from about 0.1% to about 5% by weight of 6α-methyl-17α-hydroxyprogesterone 17-acetate and an ingestible diluent.

4. A method of controlling the reproductive cycle in an ovulating human which comprises the parenteral administration to said human of a sterile dosage of from about 0.25 mg. to about 500 mg. of 6α-methyl-17α-hydroxy-progesterone 17-acetate and an aqueous injectable carrier.

References Cited

Modern Drug Encyclopedia: 5th ed., 1952, pp. 355–356, 795–800.

New and Nonofficial Drugs, 1959, pp. 512 and 514.

FRANK CACCIAPAGLIA, Jr., *Primary Examiner.*

J. D. GOLDBERG, *Assistant Examiner.*